United States Patent Office.

WALTER MILLS, OF LONDON, ENGLAND.

PROCESS OF MAKING FLUORIDS.

SPECIFICATION forming part of Letters Patent No. 582,938, dated May 18, 1897.

Application filed October 5, 1896. Serial No. 607,950. (No specimens.)

*To all whom it may concern:*

Be it known that I, WALTER MILLS, a subject of the Queen of Great Britain, residing at 7 Kilmorie Road, Forest Hill, London, England, have invented new and useful Improvements in the Manufacture of Fluorids, of which the following is a specification.

This invention has for its object to provide for the manufacture of fluorids on a commercial scale.

The preparation of fluorids according to my invention depends upon the action of ammonic fluorid or of the components thereof—viz., ammonia and hydric fluorid upon metallic salts or their aqueous solutions.

In order to prepare ammonic fluorid, I mix together finely-powdered ammonic sulfate and calcic fluorid (fluor-spar) in a similar state of division and then heat the mixture gently to a temperature of about 350° centigrade in a subliming-retort. The lower part of this apparatus may be made of cast-iron, covered internally with a thin coating of calcic sulfate, but I prefer to construct the upper part of lead and to keep it as cool as is conveniently practicable. A satisfactory method of doing this is to make the upper part of the retort concave, keeping this concavity full of water. On heating the apparatus as aforesaid a reaction takes place, which is indicated by the equation

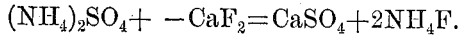
$$(NH_4)_2SO_4 + -CaF_2 = CaSO_4 + 2NH_4F.$$

The ammonic fluorid sublimes onto the upper part of the retort, along with traces of ammonic sulfate.

In the case of those metallic salts which give aqueous solutions that are not precipitated by ammonia—viz., the salts of sodium, potassium, barium, and strontium—I prefer to mix the proper quantity of ammonia with the aqueous solution and then to treat it with hydric fluorid, either in the gaseous state or dissolved in water. The gas would seem to produce the best results; but in the case of other aqueous solutions of metallic salts which give precipitates when treated with ammonia—such as the salts of aluminium, chromium, manganese, &c.—I add to the solution of the salt ammonic fluorid, either solid or dissolved in water, or I take an aqueous solution of ammonic fluorid and add the finely-ground metallic salt thereto, or I treat the solution of the metallic salt first with hydric fluorid and then with ammonia in the manner hereinafter described.

I will now describe the method by which I prepare sodic fluorid. This method is applicable to all those aqueous solutions of metallic salts which are not precipitated by ammonia, it being understood, however, that instead of the process I am now about to describe I may add ammonic fluorid, either dry or dissolved in water, to such aqueous solutions.

I take salt brine weak enough to hold in solution the ammonic chlorid that is produced by the reaction and to absorb the proper quantity of ammonia-gas without serious loss. I then blow into this brine ammonia-gas in about the proportion indicated by the ensuing equation. It is desirable to have a slight excess of ammonia in the brine in order to prevent the formation of acid sodic fluorid, (NaHF$_2$.) After the proper quantity of ammonia has been thus dissolved in the brine I introduce into the mixture, which I keep in a state of gentle agitation, gaseous hydric fluorid. In these circumstances sodic flourid is precipitated according to the equation

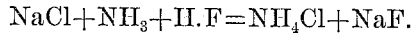
$$NaCl + NH_3 + H.F = NH_4Cl + NaF.$$

I also attain the same result by agitating ground common salt with an aqueous solution of ammonic fluorid or by adding ammonic fluorid to an aqueous solution of sodic chlorid.

It would appear that when an aqueous solution of sodic chlorid and ammonia is treated with gaseous hydric fluoric the precipitate of sodic fluorid is practically insoluble and anhydrous. When the same solution, say of a specific gravity of about 1.126, is treated with aqueous hydric fluorid, say of a specific gravity of about 1.15, a hydrated fluorid is precipitated which seems to be soluble in about thirty-two parts of water. When an aqueous solution of ammonic fluorid is treated with finely-ground sodic chlorid at the ordinary temperature, the precipitate is gelatinous and more soluble than when hot aqueous solutions of ammonic fluorid and sodic chlorid are mixed. I find in practice that the product when aqueous solutions of sodic chlorid and ammonic fluorid are mixed at about 50° centigrade and then heated with stirring to about 80° centigrade is much the same as when gaseous hydric fluorid is led into an aqueous solution of sodic chlorid and ammonia in the cold. Generally when anhydrous fluorids are required the thermal conditions of the reactions by which they are produced must be somewhat high.

Instead of using an aqueous solution of sodic chlorid, as aforesaid, I may use an aqueous solution of sodic sulfate in like manner and with the same resulting precipitate in accordance with the equation $$Na_2SO_4 + 2NH_3 + 2HF = (NH_4)_2SO_4 + 2NaF.$$

It is to be observed that an aqueous solution of sodic sulfate is not precipitated by ammonic fluorid, but if sodic sulfate in fine powder be agitated with an aqueous solution of ammonic fluorid, preferably hot, sodic fluorid is precipitated. The same may be said of potassic sulfate, but the aqueous solutions of both these sulfates give precipitates of fluorids when treated first with ammonia and then with hydric fluorid, or vice versa. Fluorid of potassium is, however, much more soluble than fluorid of sodium, and generally the behavior of these sulfates is less advantageous than that of the corresponding chlorids. In like manner to the methods by which I prepare sodic fluorid I prepare the fluorid of potassium. The sulfates of strontium and barium being practically insoluble in water I prepare the fluorids of these metals from their respective chlorids in the same way that I prepare sodic fluorid.

The methods by which I treat aqueous solutions of the chlorid or sulfate of aluminium are typical of the methods by which I prepare fluorids from aqueous solutions of the salts of those metals which are precipitated by ammonia. An aqueous solution of aluminic chlorid may be conveniently prepared by precipitating an aqueous solution of aluminic sulfate with ammonia and then dissolving the precipitate in hydrochloric acid. The presence of ammonic sulfate in the solution of aluminic chlorid thus produced does not prejudicially affect the reaction which takes place when ammonic fluorid is added to it, and is expressed by the following equation:

$$Al_2Cl_6 + 6NH_4F = 6NH_4Cl + Al_2F_6.$$

A similar precipitate is produced when an aqueous solution of aluminic sufate is treated with ammonic fluorid, thus:

$$Al_2(SO_4)_3 + 6NH_4F = 3(NH_4)_2SO_4 + Al_2F_6,$$

or I may add hydric fluorid to an aqueous solution of aluminic sulfate and then treat the mixture with ammonia, or the sulfate or chlorid of aluminium may be added in a state of powder to aqueous ammonic fluorid. Ammonia-alum may be employed advantageously instead of aluminic sulfate where a very pure fluorid of aluminium is required in large quantities, as commercial ammonia-alum is almost chemically pure. In like manner to aluminic fluorid I prepare the fluorid of chromium from either hydrated chromic chlorid, chromic sulfate, or chrome-alum. Similarly I prepare the fluorids of copper, magnesium, manganese, and zinc from their respective sulfates or chlorids.

Many compound fluorids may be prepared by this process. Thus artificial cryolite may be precipitated from mixtures of the aqueous solutions of the sulfates of aluminium and sodium or from similar mixtures of the chlorids of these metals. In the former case hydric fluorid is first added to one of the sulfates. The other sulfate is then added, and the mixture is treated with ammonia. The double fluorid of magnesium and potassium may also be prepared in like manner and with the like precautions. Similarly many other compound fluorids may be prepared.

Having thus described my invention, what I claim is—

1. In a method of obtaining metallic fluorids, the subprocess of manufacturing ammonic fluorid which consists in heating together a mixture of ammonic sulfate and calcic fluorid (fluor-spar), substantially as described.

2. The method of preparing metallic fluorids from aqueous solutions of metallic salts, such as specified, which consists in heating together a mixture of ammonic sulfate and calcic fluorid (fluor-spar) and then adding the ammonic fluorid thus obtained to the respective solutions, substantially as described.

3. The method of preparing metallic fluorids from aqueous solutions of metallic chlorids, such as specified, which consists in heating together a mixture of ammonic sulfate and calcic fluorid (fluor-spar) and then adding the ammonic fluorid thus obtained to the chlorid solution, substantially as described.

In testimony whereof I have hereunto set my hand in presence of two subscribing witnesses.

WALTER MILLS.

Witnesses:
HOWARD OVIATT,
PERCY E. MATTOCKS.